Feb. 28, 1961

C. GERST 2,972,901

FORWARD AND REVERSE REDUCTION TRANSMISSION

Filed Oct. 14, 1959

INVENTOR.
Chris Gerst.
BY
Ballaff and McKinley
ATTORNEYS.

Feb. 28, 1961 C. GERST 2,972,901
FORWARD AND REVERSE REDUCTION TRANSMISSION
Filed Oct. 14, 1959 3 Sheets-Sheet 2
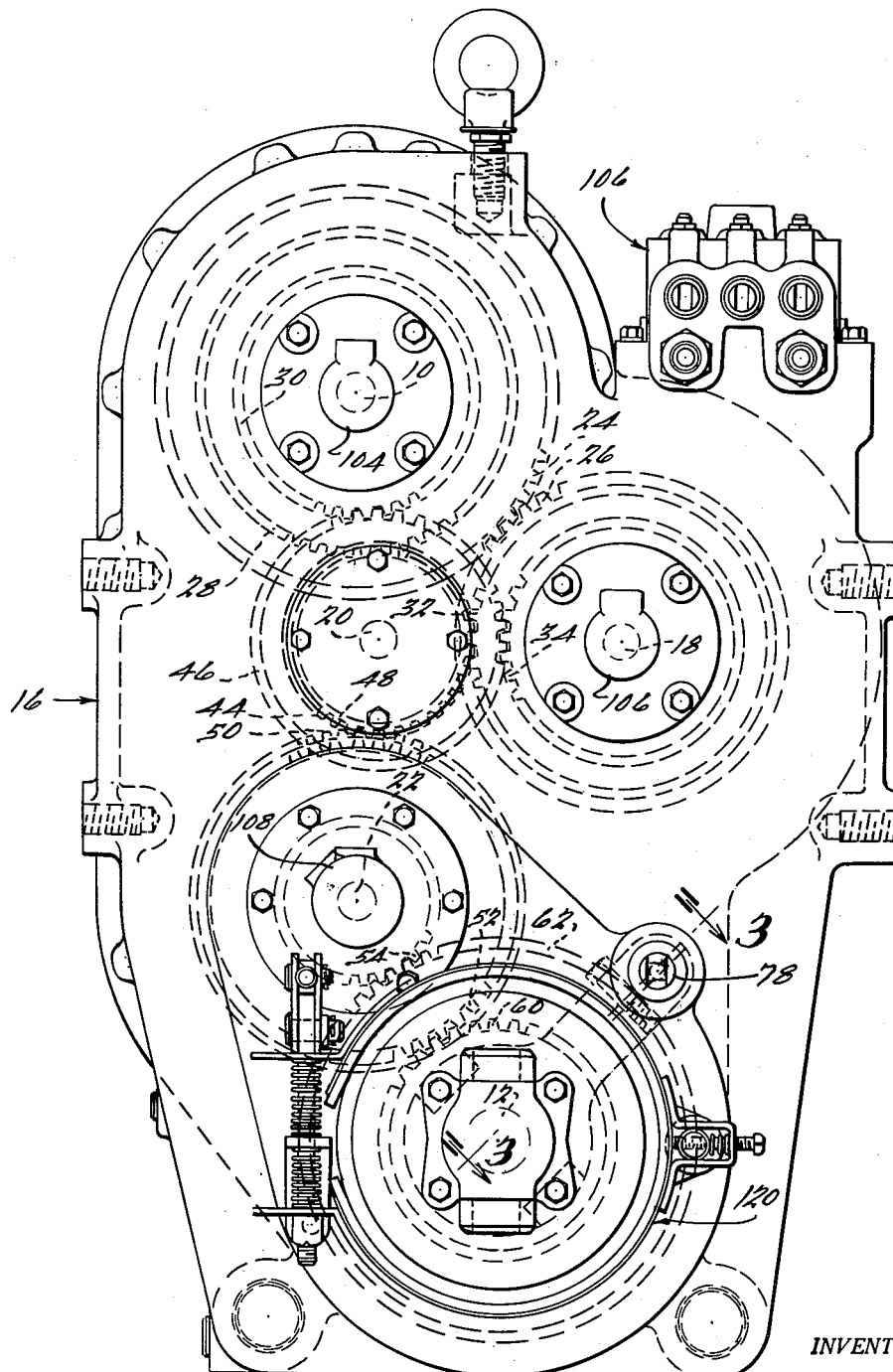
INVENTOR.
Chris Gerst.
BY
Balluff and McKinley
ATTORNEYS Feb. 28, 1961 C. GERST 2,972,901
FORWARD AND REVERSE REDUCTION TRANSMISSION
Filed Oct. 14, 1959 3 Sheets-Sheet 3

INVENTOR.
Chris Gerst.
BY
Balluff and McKinley
ATTORNEYS.

United States Patent Office 2,972,901
Patented Feb. 28, 1961

2,972,901
FORWARD AND REVERSE REDUCTION TRANSMISSION

Chris Gerst, 8059 Sorento, Detroit, Mich.

Filed Oct. 14, 1959, Ser. No. 846,482

11 Claims. (Cl. 74—360)

This invention relates to power transmissions and has particular reference to a forward and reverse multiple speed reduction transmission adapted to provide a four-speed drive in both forward and reverse between the engine of a vehicle, such as a power shovel or loader, and the front and rear wheels thereof. In general the present invention relates to power transmissions of the type disclosed in my prior United States Patent 2,804,780, issued September 3, 1957, for "Power Transmission."

A principal object of the invention is to provide a simple, efficient, rugged and novel forward and reverse reduction transmission which is particularly adapted for use in off-the-road vehicles.

Other and further objects of the invention will be apparent from the following description and claims and may be understood by reference to the accompanying drawings, of which there are three sheets, which by way of illustration show a preferred embodiment of the invention and what I now consider to be the best mode of applying the principles thereof. Other embodiments of the invention may be used without departing from the scope of the present invention as set forth in the appended claims.

In the drawings:

Figure 2 is a rear elevational view thereof;

Figure 1:
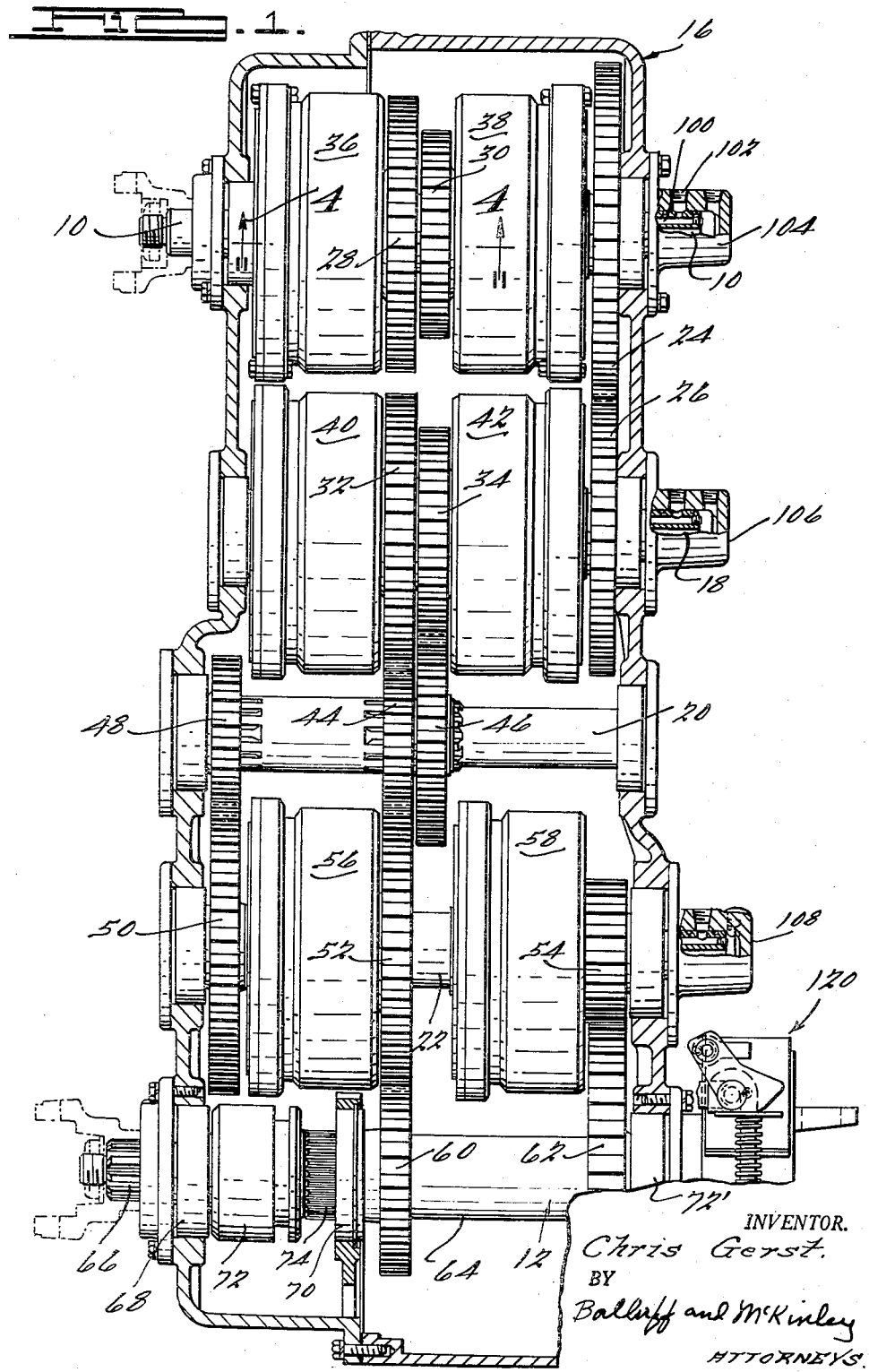
Figure 1 is a developed sectional view of a transmission embodying the invention.
Figure 3:
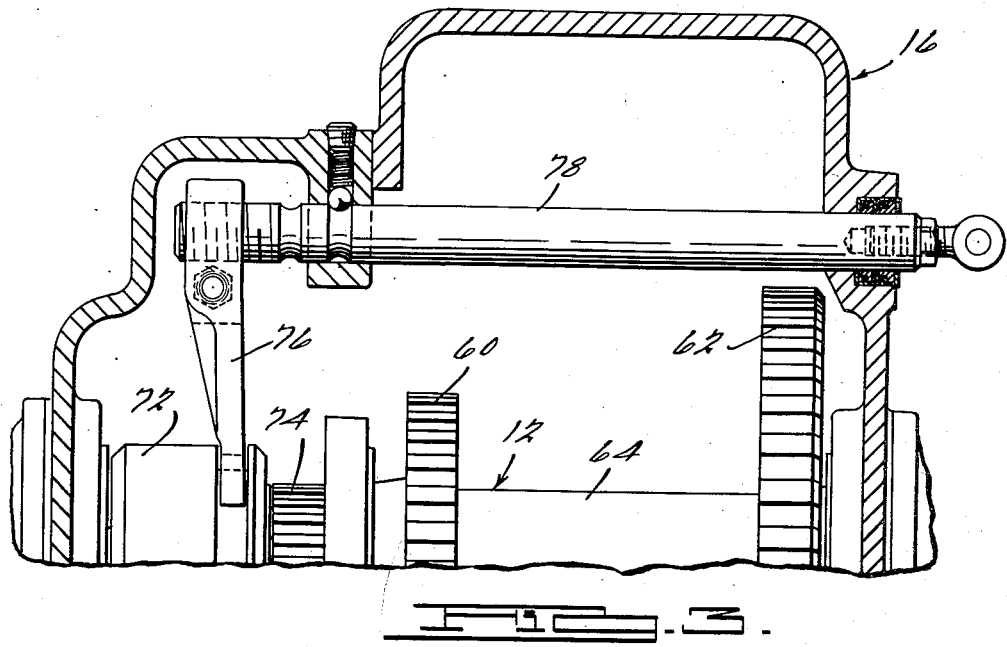
Figure 3 is an enlarged fragmentary sectional view taken along the line 3—3 of Figure 2.

The transmission illustrated provides four speeds reduction in both forward and reverse gears between an input shaft 10 and the output shaft 12. The transmission includes in general a housing or casing 16, a pair of drive or clutch shafts 10 and 18, a distributor shaft 20, a countershaft 22 and the output shaft 12, such shafts being disposed in parallel relation and journaled in suitable bearings mounted in the housing 16 which encloses the shafts and other working parts of the transmission and provides a lubricant containing casing therefor. The shafts are shown in a developed view in Figure 1 while the actual relation of the shafts is shown in Figure 2.

Figure 4:
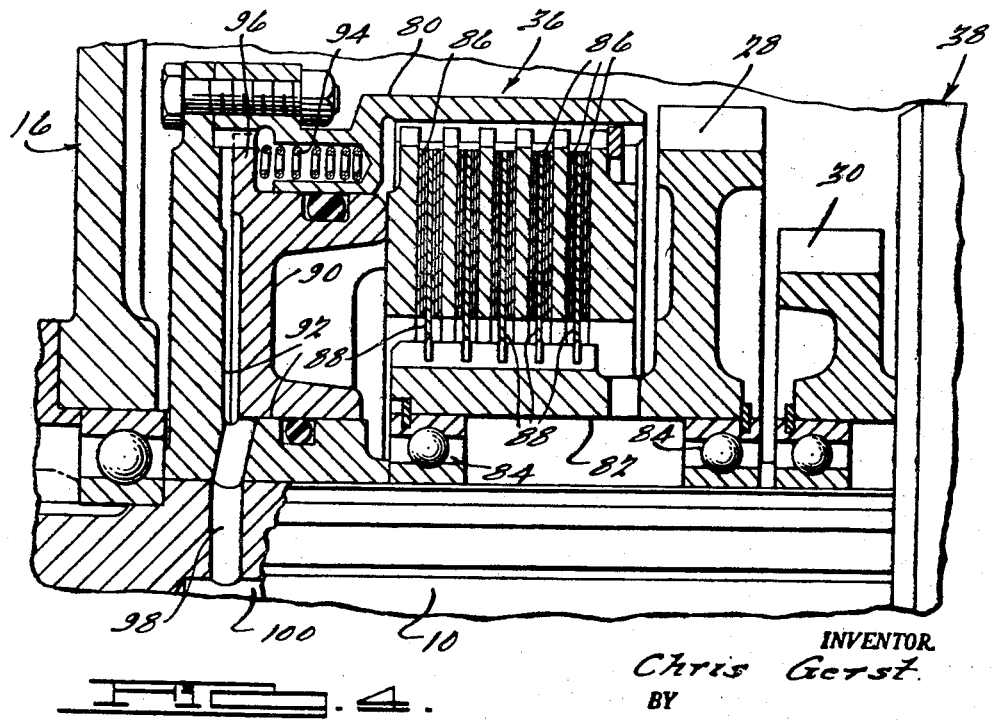
Figure 4 is an enlarged fragmentary sectional view of one of the clutches and taken generally along the line 4—4 of Figure 1.

The drive or clutch shafts 10 and 18 are geared together for rotation in opposite directions at different relative speeds by constant mesh gears 24 and 26, gear 24 being fixed to the shaft 10 for rotation therewith and gear 26 being fixed to the shaft 18 for rotation therewith. Shaft 10 has gears 28 and 30 journaled thereon, such gears being rotatable independently of each other. Shaft 18 has gears 32 and 34 journaled thereon, such gears 32 and 34 being rotatable independently of each other. A normally disengaged hydraulically actuated multiple disc clutch 36 is operatively disposed between the shaft 10 and the gear 28 and is adapted when engaged to couple the gear 28 to the shaft 10 for rotation therewith. An enlarged fragmentary sectional view of the clutch is shown in Figure 4 and is described hereafter. A normally disengaged clutch 38 like the clutch 36 is operatively disposed between the gear 30 and the shaft 10 and is adapted when engaged to couple the gear 30 to the shaft 10 for rotation therewith. A normally disengaged clutch 40, like the clutch 36 is operatively disposed between the gear 32 and the shaft 18 and is adapted when engaged to couple the gear 32 to the shaft 18 for rotation therewith. A normally disengaged clutch 42 like the clutch 36 is operatively disposed between the gear 34 and the shaft 18 and is adapted when engaged to couple the gear 34 to the shaft 18 for rotation therewith.

The gears 32 and 28 are each in constant mesh with a gear 44 fixed to the distributor shaft 20 for rotation therewith while the gears 30 and 34 are each in constant mesh with a gear 46 fixed to the distributor shaft 20 for rotation therewith. The clutches 36, 38, 40 and 42 are adapted to be selectively engaged whereby the shaft 20 may be driven at two different speeds, forwardly or reversely with respect to input shaft 10. Usually the input shaft 10 is coupled with a unidirectional power driven shaft, and the shafts 10 and 18 will be driven unidirectionally.

A gear 48 fixed to the distributor shaft 20 for rotation therewith is in constant mesh with a gear 50 fixed to the countershaft 22 for rotation therewith, whereby the countershaft 22 rotates with the distributor shaft 20, but at a slower speed. Gears 52 and 54 are journaled on the countershaft 22. A normally disengaged clutch 56 like the clutch 36 is operatively disposed between the gear 52 and the countershaft 22 and is adapted when engaged to couple the gear 52 to the countershaft 22 for rotation therewith. A normally disengaged clutch 58 like the clutch 36 is operatively disposed between gear 54 and the shaft 22 and is adapted when engaged to couple the gear 54 to the shaft 22 for rotation therewith. The clutches 56 and 58 are selectively operable whereby either the gear 52 or 54 may be coupled to the countershaft 22 for rotation therewith.

The output shaft 12 has gears 60 and 62 fixed thereon for rotation therewith, the gear 60 being in constant mesh with the gear 52 on the countershaft 22 while the gear 62 is in constant mesh with the gear 54 on the countershaft 22, whereby the output shaft may be driven from the countershaft 22 through the clutch controlled gear train 52, 60 or the clutch controlled gear train 54, 62 depending upon which of the clutches 56, 58 is engaged. The output shaft 12 comprises two aligned sections 64 and 66 the ends of which project from opposite sides of the transmission housing 16. The section 66 is journaled in a bearing 68, and also in one end of the section 64 while the latter is journaled in bearings 70 and 72', whereby the section 64 of the output shaft 12 may be driven independently of the section 66 with the parts arranged as illustrated in Figure 1. A toothed clutch which includes a shiftable clutch member 72 slidably splined on the section 66 is adapted when shifted to the right to engage the splines 74 on the end of the section 64 for coupling the sections 64 and 66 together for rotation as a unit. A shift fork 76 running in a groove in the clutch member 72 is carried by an axially shiftable shift rod 78, one end of which projects from the transmission housing 16, whereby the clutch member 72 may be axially shifted between two positions, the disengaged position as shown and the engaged position in which the internal splines on the clutch member 72 mate with the external splines 74 of the section 64 for coupling the two sections of the output shaft together for rotation as a unit.

The hydraulically actuated multiple disc clutches 36, 38, 40, 42, 56 and 58 essentially embody the construction disclosed in my prior United States Patent No. 2,880,834, issued April 7, 1959, for Hydraulic Actuated Multiple Disc Clutch. As illustrated in Figure 4 the clutch 36 comprises in general a driving drum 80 which is fixed to the shaft 10 for rotation therewith and a hub or driven part 82 which is integral with the gear 28 for rotation therewith. The hub 82 and gear 28 are journaled on the shaft 10 by means of ball bearings 84. A series of interleaved clutch discs 86 and 88 alternately connected to the drum 80 and the hub 82 are adapted when clamped together to couple the clutch parts 82 and 80 together, and thus couple the gear 28 to the shaft 10 for rotation therewith. An annular hydraulic piston 90 operatively disposed in an annular cylinder 92 in the drum 80 is adapted when subjected to hydraulic pressure to react on the clutch discs 86 and 88 for clamping the same together so as to engage the clutch 36. A series of coil springs 94 disposed around the periphery of drum 80 is arranged to react between the drum 80 and an annular flange 96 on the piston 90 for biasing the piston to its disengaged position so that as soon as the hydraulic pressure is released in the cylinder 92 the piston 90 will move so as to release the pressure on the clutch discs and thus disengage the clutch.

A lateral duct 98 in the shaft 10 and the hub of the drum 80 interconnects the hydraulic cylinder 92 with an axial bore 100 in the shaft 10 which communicates at the outer end of the shaft 10 with a port 102 in a cap 104, whereby hydraulic fluid under pressure may be supplied to the cylinder 92 for actuating the piston 90 to engage the clutch. The cap 104 surrounds the end of the shaft 10 which projects through a wall of the transmission housing and provides a means whereby hydraulic fluid under pressure may be supplied to the clutch 36 for engaging the same. The supply of hydraulic fluid under pressure to the clutch 36 is controlled by a control valve 106 which may be manually operated so as to engage or release the clutch 36.

The valve 106 comprises a multiple control valve for controlling the supply of hydraulic fluid pressure to the clutches 36, 38, 40, 42, 56 and 58. The shaft 10 is provided with ducts similar to that just described, whereby hydraulic fluid under pressure may be supplied to the clutch 38. The shafts 18 and 22 are similarly provided with caps 106 and 108 like the cap 104 whereby hydraulic fluid under pressure may be supplied to the clutches 40, 42, 56 and 58. The control valve 106 is arranged so that only one of the clutches 36, 38, 40 and 42 may be engaged at one time, and the control 106 provides a means for selectively engaging the clutches 36, 38, 40 and 42. Either the clutch 56 or 58 may be engaged but not both at the same time.

The valve 106 and the relating hydraulic system for controlling the multiple disc clutches 36, 38, 40, 42, 56 and 58 is of the type disclosed in my prior Patent No. 2,804,780.

Engagement of the clutches 36 and 56 will provide a high speed forward drive between the input shaft 10 and the output shaft 12, while engagement of the clutches 38 and 56 will provide a third speed forward drive. Engagement of the clutches 36 and 58 will provide a second speed forward drive while engagement of the clutches 38 and 58 will provide a low speed forward drive. Engagement of the clutches 40 and 56 will provide a high speed reverse drive between the input shaft 10 and the output shaft 12 while engagement of the clutches 42 and 56 will provide a third speed reverse drive between the input shaft 10 and the output shaft 12. Engagement of the clutches 40 and 58 will provide a second speed reverse drive between the shafts 10 and 12 while engagement of the clutches 42 and 58 will provide a low speed reverse drive between the shafts 10 and 12. The following is a tabulation of the gear ratios provided in the transmission shown between the input and output shafts 10 and 12:

Gear ratios

|  | Forward | Reverse |
|---|---|---|
| High | .702 to 1 | .583 to 1 |
| Third | 1.385 to 1 | 1.15 to 1 |
| Second | 2.53 to 1 | 2.1 to 1 |
| Low | 5 to 1 | 4.15 to 1 |

The section 66 of the output shaft 12 is adapted for connection to the front wheels of a vehicle for driving the same while the section 64 is adapted for connection to the rear wheels of the vehicle for driving the same. When the clutch 72, 74 is disengaged, as shown, only the rear wheels will be driven. A brake indicated generally at 120 may be operatively associated with the section 64 of the output shaft 12 for braking purpose.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. A forward and reverse reduction transmission comprising a pair of clutch shafts geared together for rotation in opposite directions, one of said shafts forming an input shaft for the transmission, a distributor shaft having first and second gears fixed thereon for rotation therewith, a first set of gears including a forward drive gear journaled on one clutch shaft and a reverse drive gear journaled on the other clutch shaft geared with said first gear on said distributor shaft, a second set of gears including a forward drive gear journaled on one clutch shaft and a reverse drive gear journaled on the other clutch shaft geared with said second gear on said distributor shaft, a normally disengaged clutch operatively disposed between each of said gears of said sets of gears on said clutch shafts and its respective shaft and operable when engaged for coupling such a gear with the shaft on which it is journaled, a countershaft disposed parallel to and geared with said distributor shaft so as to be driven thereby, a plurality of gears journaled on said countershaft for rotation relative thereto, a normally disengaged clutch operatively disposed between each of said gears on said countershaft and said countershaft and operable when engaged for coupling such gear with said countershaft for rotation therewith, and an output shaft disposed parallel with said countershaft and having gears thereon geared with said gears on said countershaft, said clutches on said countershaft being selectively engageable.

2. A transmission according to claim 1 wherein said clutches are hydraulically actuated multiple disc clutches.

3. A forward and reverse reduction transmission comprising a pair of drive shafts geared together for rotation in opposite directions, a first set of gears including a forward drive gear journaled on one drive shaft and a reverse drive gear journaled on the other drive shaft, a distributor shaft having a gear thereon geared with said forward and reverse gears, a second set of gears including a forward drive gear journaled on one drive shaft and a reverse drive gear journaled on the other drive shaft, a second gear on said distributor shaft geared with said forward and reverse gears of said second set, a normally disengaged clutch operatively disposed between each of said gears of said sets of gears on said drive shafts and its respective shaft and operable when engaged for coupling such gear with the shaft on which it is journaled, a countershaft disposed parallel to and geared with said distributor shaft so as to be driven thereby, a plurality of gears journaled on said countershaft for rotation relative thereto, a normally disengaged clutch operatively disposed between each of said gears on said countershaft and said countershaft and operable when engaged for selectively coupling such gear with said countershaft for rotation therewith, and an output shaft disposed parallel with said countershaft and having gears thereon geared with said gears on said countershaft.

4. A forward and reverse reduction transmission comprising a pair of unidirectional shafts geared together for rotation in opposite directions, a distributor shaft having first and second gears fixed thereon for rotation therewith, a first set of gears including a forward drive gear journaled on one unidirectional shaft and a reverse drive gear journaled on the other unidirectional shaft geared with said first gear on said distributor shaft, a second set of gears including a forward drive gear journaled on one unidirectional shaft and a reverse drive gear journaled on the other unidirectional shaft geared with said second gear on said distributor shaft, a normally disengaged clutch operatively disposed between each of said gears on said unidirectional shafts and its respective shaft and operable when engaged for coupling such gear with the shaft on which it is journaled, a counter-shaft geared with said distributor shaft so as to be driven thereby, a plurality of gears journaled on said countershaft for rotation relative thereto, a normally disengaged clutch operatively disposed between each of said gears on said countershaft and said countershaft and operable when engaged for selectively coupling such gear with said countershaft for rotation therewith, and an output shaft having gears thereon geared with said gears on said countershaft, said shafts being arranged in parallel relation with each other.

5. A transmission according to claim 4 wherein said reverse drive gears are mounted on the same unidirectional shaft which is directly geared by constant mesh gearing to the other unidirectional shaft so as to rotate at a slower relative speed.

6. A forward and reverse reduction transmission comprising a pair of unidirectional shafts geared together for rotation in opposite directions, a distributor shaft having first and second gears fixed thereon for rotation therewith, a first set of gears including a forward drive gear journaled on one unidirectional shaft and a reverse drive gear journaled on the other unidirectional shaft in constant mesh with said first gear on said distributor shaft, a second set of gears including a forward drive gear journaled on one unidirectional shaft and a reverse drive gear journaled on the other unidirectional shaft in constant mesh with said second gear on said distributor shaft, a normally disengaged multiple disc clutch operatively disposed between each of said gears on said unidirectional shafts and its respective shaft and operable when engaged for coupling such gear with the shaft on which it is journaled, a countershaft disposed parallel to and geared with said distributor shaft so as to be driven thereby, a plurality of gears journaled on said countershaft for rotation relative thereto, a normally disengaged multiple disc clutch operatively disposed between each of said gears on said countershaft and said countershaft and operable when engaged for selectively coupling such gear with said countershaft for rotation therewith, and an output shaft disposed parallel with said countershaft and having gears thereon in constant mesh with said gears on said countershaft.

7. A transmission according to claim 6 wherein said output shaft comprises two aligned sections and a clutch for coupling said sections together for rotation as a unit.

8. A forward and reverse reduction transmission comprising a pair of unidirectional clutch shafts geared together by constant mesh gearing for rotation in opposite directions at different relative speeds, a distributor shaft having first and second gears fixed thereon for rotation therewith, a first set of gears including a forward drive gear journaled on one unidirectional shaft and a reverse drive gear journaled on the other unidirectional shaft in constant mesh with said first gear on said distributor shaft, a second set of gears including a forward drive gear journaled on one unidirectional shaft and a reverse drive gear journaled on the other unidirectional shaft in constant mesh with said second gear on said distributor shaft, a normally disengaged clutch operatively disposed between each of said gears on said unidirectional clutch shafts and its respective shaft and operable when engaged for coupling such gear with the shaft on which it is journaled, a counter-shaft disposed parallel to and geared directly with said distributor shaft so as to be driven thereby, a plurality of gears journaled on said countershaft for rotation relative thereto, a normally disengaged clutch operatively disposed between each of said gears on said countershaft and said countershaft and operable when engaged for selectively coupling such gear with said countershaft for rotation therewith, and an output shaft disposed parallel with said countershaft and having gears thereon in constant mesh with said gears on said countershaft.

9. A forward and reverse reduction transmission comprising a pair of clutch shafts geared together for rotation in opposite directions, at different relative speeds, a distributor shaft having first and second gears fixed thereon for rotation therewith, a first set of gears including a forward drive gear journaled on one clutch shaft and a reverse drive gear journaled on the other clutch shaft in constant mesh with said first gear on said distributor shaft, a second set of gears including a forward drive gear journaled on said one clutch shaft and a reverse drive gear journaled on said other clutch shaft in constant mesh with said second gear on said distributor shaft, a normally disengaged multiple disc clutch operatively disposed between each of said gears on said clutch shafts and its respective shaft and operable when engaged for coupling such gear with the shaft on which it is journaled, a countershaft geared with said distributor shaft so as to be driven thereby, a plurality of gears journaled on said countershaft for rotation relative thereto, a normally disengaged multiple disc clutch operatively disposed between each of said gears on said countershaft and said countershaft and operable when engaged for selectively coupling such gear with said countershaft for rotation therewith, and an output shaft having gears thereon in constant mesh with said gears on said countershaft, said shafts being disposed in parallel with each other.

10. A transmission according to claim 8 wherein said shafts are disposed in parallel with each other and wherein the ends of said output shaft project from opposite sides of said transmission.

11. A transmission according to claim 9 wherein said clutches are hydraulically actuated.

References Cited in the file of this patent

UNITED STATES PATENTS

| | | |
|---|---|---|
| 2,712,245 | Lee | July 5, 1955 |
| 2,804,780 | Gerst | Sept. 3, 1957 |
| 2,825,232 | Sieving et al. | Mar. 4, 1958 |